Jan. 21, 1941.    J. D. LANGDON    2,229,179

SAFETY MARKER

Filed Jan. 5, 1938

INVENTOR

BY *J. D. Langdon*

ATTORNEY

Patented Jan. 21, 1941

2,229,179

UNITED STATES PATENT OFFICE 2,229,179

SAFETY MARKER

Jesse D. Langdon, Los Angeles, Calif.

Application January 5, 1938, Serial No. 183,452

1 Claim. (Cl. 88—79)

My invention relates to improvements in highway markers and has for its objects:

*First.*—The provision of a safety device in the shape of a protected light reflector adapted to be inserted in the paving of a roadway, sidewalk or highway and capable of reflecting light rays in universal directions within the scope of a semispherical lens.

*Second.*—To provide a cushioned retaining core forming an anchoring unit for a lens reflector.

*Third.*—To provide a suitable casing comprising anchoring means for incorporating the marker into the body of the pavement.

*Fourth.*—To provide a safety highway marker having a vertically disposed lens flexibly cushioned to withstand impact, said lens provided with a reflecting element sealed against the entry of water, dust or other foreign substance thereinto to preclude the effect of freezing temperatures interfering with the operation and efficiency of the device.

*Fifth.*—To provide a safety marker which can be run over by road vehicles, tractors, road scrapers and the like, with a minimum of hazard to a glass reflector lens.

*Sixth.*—To provide a reflector lens having a reflecting element molded therein formed with reflecting facets of such contour that light will be reflected and deflected in universal directions within the contour of said lens.

*Seventh.*—To provide a light reflecting road marker with a lens so disposed as to be subject to the abrasive and frictional polishing effect of vehicular traffic on the highway in which incorporated to assure visibility against the effect of dirt and dust.

The following specification of my invention contains several alternative structures for the reduction of my invention to practice, and any of the various elements shown by the drawing, which are for the purpose of illustration only, or any departure therefrom within the scope of the claim, may be used.

Of the drawing—

Fig. 1 is a vertical section of one form of the invention including lens 1, reflecting element 2, facets 2A and 2B, rubber cushion core 3, compression space 4, flanged anchor casing 5.

Figure 1:
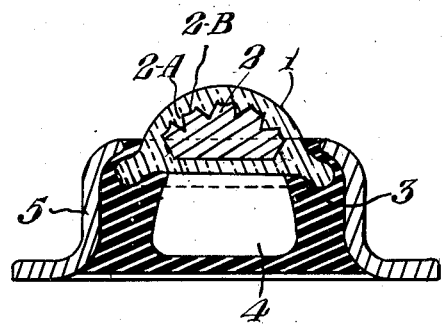
Figure 2:
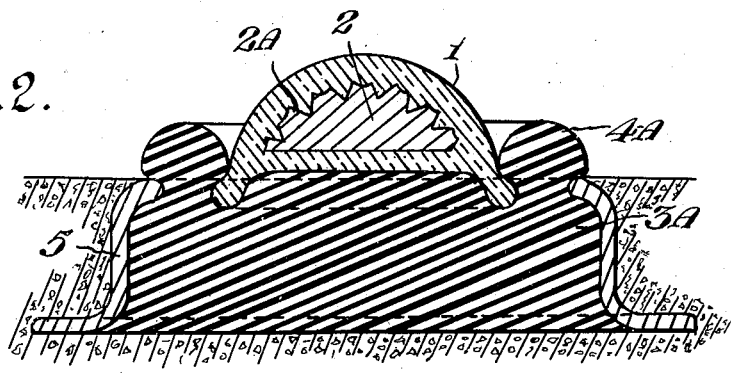
Fig. 2 is a vertical section of an alternative structure as to that of Fig. 1, having a resilient cushion core 3A with an expansion surface 4A shown as being embedded in a fragmentary portion of concrete.

The construction of my safety marker comprises a reflecting lens or mirror body 1 having a reflecting element 2 formed with angular facets 2A and concave facets 2B molded integral within said lens, the reflecting element 2 being made of some metallic or other suitable substance having light reflecting qualities, said lens 1 being incorporated into a rubber core or body 3 which is provided with either a compression space 4 as of Fig. 1 and/or an expansion surface 4A as of Fig. 2 providing a line of least resistance for movement or deformation of core or body 3 which is in turn surrounded by a metal casing 5 or may consist of the relatively hard road surfacing material itself.

It will be noted that the casing 5 may be stamped of sheet metal if desired, and is formed with a basal flange to serve as an anchor, while the gradual tapered or conical form toward the top holds the core in place still allowing for a comparatively free movement of the resilient core 3 or 3A through the expansion space provided between lens 1 and casing 5 toward the expansion surface 4A when the core 3 is compressed by pressure or impact. Either of the two forms of core 3A or 3 is such that it will be securely anchored when incorporated in a pavement acting as a casing in place of a metal one.

The form shown in Fig. 1 when the lens is struck or subjected to pressure, being provided with a compression space 4, allows the core 3 to deform by the movement of the resilient material inwardly around the compression space and outwardly and upwardly around the lens 1 according to the extent that atmospheric pressure is overcome by the impact or pressure exerted against said lens 1, because the resilient material flows at all times toward the line of least resistance formed by the compression space 4 and/or the expansion surface 4A, according to the displacement of the lens 1 when pressure is applied thereto.

Particular attention is called to the fact that the drawing shows a core or body 3 to be of sufficient extent and volume to allow for the displacement of the mirror body 1 by pressure against it to the extent that pressure is exerted until both bodies have reached a common level.

When the structure as of Fig. 2 is used, a much wider space is provided to facilitate the flow or movement of the resilient material of core 3 between the lens 1 and the constricted top edge of casing 5 the compression space 4 being absent.

The expansion surface 4A of Fig. 2 forms a protective cushion to modify any impact against the lens 1 particularly where the larger sized markers are used such as around safety zones, etc. The expansion surface 4A may be made flush between the top edge of the casing 5 and lens 1 if desired.

It will be noted that the resilient material of the core 3 will be bulged outwardly at the time of impact or pressure in a manner to preclude the entry of foreign substances such as dust or water between the lens 1 and the resilient material of the core 3 or 3A or between the casing 5 and the resilient material of the core 3 or 3A. Therefore water cannot enter the device and be frozen to affect the efficient operation of the marker.

Figure 3:
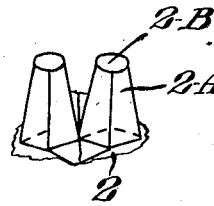
Fig. 3 is a fragmentary portion of the reflector 1 showing radially disposed pyramidal facets formed by the reflecting element 2 and having concave facets 2B and angular facets 2A.

By using the pyramidal form or facets as of Fig. 3, the facets 2A constituting the sides converge to a concave apex. The combination of the angular and concave facets of Fig. 3 will alternately diffuse and concentrate beams of light in practically all directions within the scope of the outer curvature of the reflecting lens 1. These reflected beams will scintillate due to the effect of a moving light and will be universally visible from practically any direction toward the source of light regardless of the impingement angle of the light ray.

Figure 4:
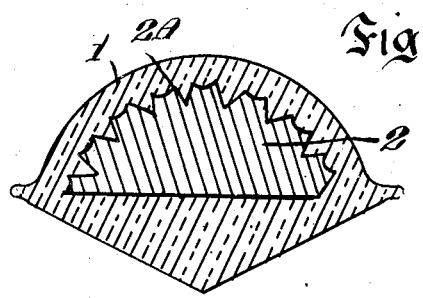
Fig. 4 is a vertical section through an alternative lens structure having an inverted conical base.

The lens as of Fig. 4 is the preferable type of lens recommended for use in the marker, and has an inverted conical base which tends to enhance the forcing of the material of the core 3 radially outward thus requiring a minimum of pressure to bulge the resilient material of the core 3 outwardly through the space or aperture between the upper rim of the casing 5 and the lens 1. This form also serves to give the lens more body and strength to withstand impact.

Particular attention is called to the body 3 made of deformable material into which the lens 1 is inserted, the body 3 being soft enough to give and flow under pressure, elastic enough to return to its normal form when said pressure is relieved, and resilient enough to rebound quickly when struck. The body 3 or 3A is of such volume and contour in proportion to the mirror body 1 that when it is subjected to pressure or struck the material of the body 3 or 3A is squeezed and flows upwardly or outwardly toward the area as at 4A, a sufficient space being provided between the lens 1 and the casing 5 to allow the material to flow easily and protrude a sufficient amount to absorb part of the impact against the lens body 1 when struck or subjected to pressure. It will be seen that the flow of material is such that water, particles of gravel, sand, or other foreign substances, are excluded from entering behind the lens 1 at all times. The lens 1 is preferably provided with a smooth exposed exterior surface to enhance the possibilities of polishing because of passing traffic such as automotive vehicles having rubber tires as when the marker is inserted in a roadway.

Having described my invention, the structure, use and operation thereof, I claim:

A safety marker comprising a lens having mirror facets incorporated therein and having a portion normally protruding above, and the balance of said lens having an outwardly extended portion embedded into a resilient body of deformable material elastic enough to resume normal shape after being deformed, said body of deformable material being of sufficient volume and extent to allow said lens when displaced by pressure to be forced into the material of said body and force a portion of said body outwardly through a space provided between a relatively hard casing surrounding said body of deformable material and the outward circumference of said lens and a rim having an inwardly extending flange adjacent to said lens, said body of deformable material having a flared base to provide anchorage under the surrounding surface where used, said resilient body snugly contacting the entire radial-lateral surface of said lens at all times in a manner whereby the material of said body will hug the lens when depressed and said material will be displaced according to the extent of any pressure exerted against said lens, said resilient body having an annular cushioning bead extending between said outwardly extended portion of the lens and the inwardly extending rim of the casing and covering their upper surfaces.

JESSE D. LANGDON.